March 8, 1966 H. I. OSHRY ET AL 3,239,663
VELOCITY MEASUREMENT UTILIZING NEUTRON ACTIVATION OF OXYGEN
Filed Dec. 4, 1961 2 Sheets-Sheet 1

HOWARD I. OSHRY
ARTHUR H. YOUMANS
INVENTORS

March 8, 1966 H. I. OSHRY ET AL 3,239,663
VELOCITY MEASUREMENT UTILIZING NEUTRON ACTIVATION OF OXYGEN
Filed Dec. 4, 1961
2 Sheets-Sheet 2
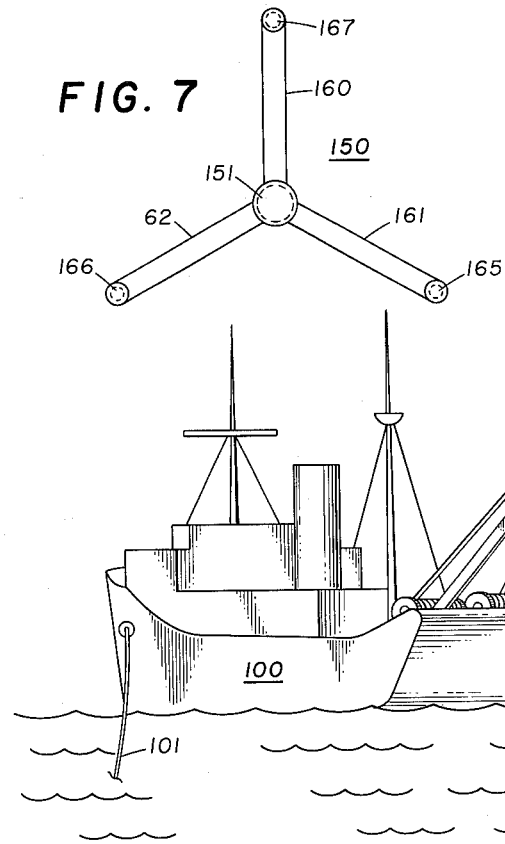
FIG. 7
FIG. 6
FIG. 5
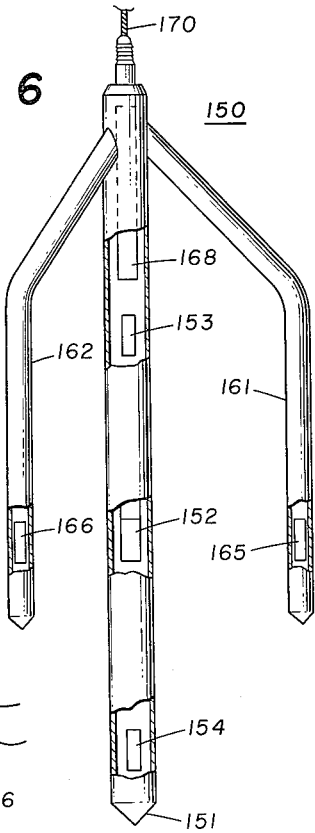
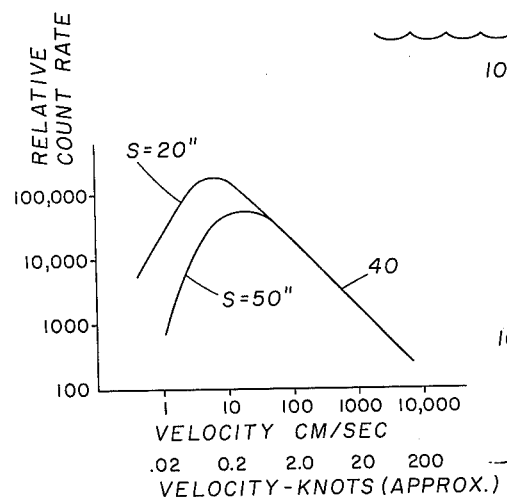
FIG. 4
HOWARD I. OSHRY
ARTHUR H. YOUMANS
INVENTORS
BY United States Patent Office 3,239,663
Patented Mar. 8, 1966

3,239,663
VELOCITY MEASUREMENT UTILIZING NEUTRON ACTIVATION OF OXYGEN
Howard I. Oshry and Arthur H. Youmans, Houston, Tex., assignors to Dresser Industries, Inc., Dallas, Tex., a corporation of Delaware
Filed Dec. 4, 1961, Ser. No. 157,320
17 Claims. (Cl. 250—43.5)

This invention relates to the measurement of relative movement between a fluid and a sensing station within said fluid and more particularly to neutron activation of oxygen and detection of variations in positions of a resultant activated atmosphere.

The speed of marine vessels such as submarines and boats has been measured by use of devices which generally involve a projection from the hull of the vessel in order mechanically to sense movement through the water. Such projections are undesirable. Furthermore, it is often desirable to determine not only speed of a vessel but direction of movement without production of extraneous signals or modification of physical conditions beyond the locale of the point of measurement.

Systems have been developed for the purpose of charting ocean currents and the like but have been based upon mechanical or electromagnetic flow sensing methods.

It is an object of the present invention to measure relative movement between a given body of fluid and a measuring station within the fluid. It is a further object of the invention to provide for measurement of flow such as in ocean currents over a range of from very low flow to velocities of the order of many knots.

It is a further object of the present invention to provide nuclear speed determination for a marine unit in which an oxygen-activated atmosphere initially is symmetrical to a first station in a supporting medium and in which variations in symmetry are determined.

In accordance with the present invention there is provided a method of measuring relative movement between a fluid and a sensing station within the fluid. The fluid in a limited zone thereof is irradiated in the region of the sensing station with high energy neutrons to activate oxygen nuclei in the zone by production of Nitrogen 16. The activated nuclei thus produced initially are symmetrically distributed with respect to the source of radiation. Differences in symmetry as produced by the relative movement between the source and the sensing station and then sensed at detecting points spaced from the irradiated zone. The magnitude of the differences in symmetry are then registered as indications of rate and/or direction of flow.

In accordance with a further embodiment of the invention there is provided a neutron source actuated to excite oxygen atoms in water at a distance sufficiently beyond the hull of a vessel to insure relatively static positioning of a major portion of the excited nuclei as the vessel moves bringing the excited nuclei into registration with a measuring station.

In a still more specific aspect of the invention there is provided a speed indicator which includes a high energy neutron source mounted inside the hull of a vessel below the water line thereof and preferably near the bow. Collimating means are provided for directing neutrons from the source in a narrow beam extending from the hull of the vessel in order to excite oxygen nuclei in the water spaced from the hull as well as in the sheath of water which frictionally is drawn along with the hull. Collimated detector means supported inside the hull aft of the source detect the excited oxygen nuclei outside the hull. Collimating means for the detector means limit the response of the detector to excited oxygen to narrow zones perpendicular to the hull at the locations of the detector means. Means are then provided for measuring the response of the detector means in order to indicate the velocity with which the vessel travels.

In accordance with a further aspect of the invention, a pulse radiation source is employed with a time measurement dependent upon the movement of a pair of detecting stations into registration with excited oxygen nuclei.

In accordance with a further aspect of the invention, a pulse system is employed with a counting rate measuring unit in order to determine relative velocity. In a still further aspect of the invention there is provided a combination of a counting rate system and a time measurement system in order that overlapping velocity ranges can be measured to give a complete spectrum of velocities from very, very low velocity to highest velocities encountered.

For a more complete understanding of the present invention and for further objects and advantages thereof, reference may now be had to the following description taken in conjunction with the accompanying drawings in which.

Figure 2:
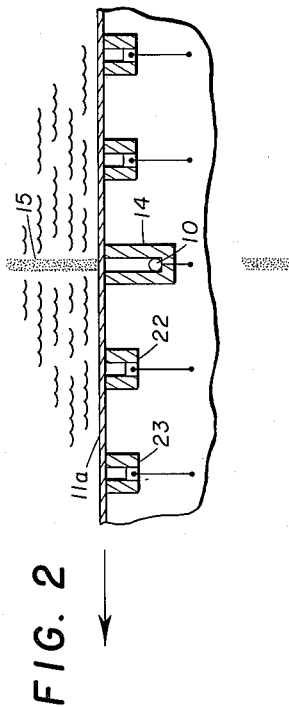
FIGURE 2 is a sectional view of a section of the hull of the vessel of FIGURE 1.
Figure 3:
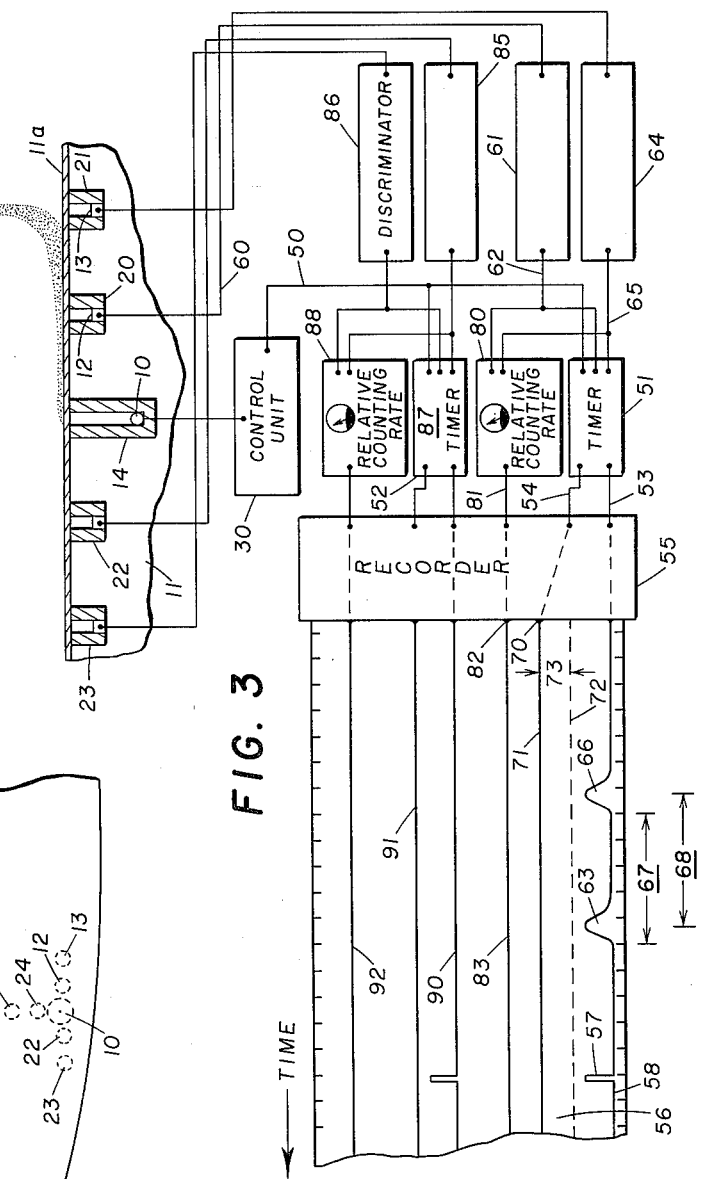
Figure 1:
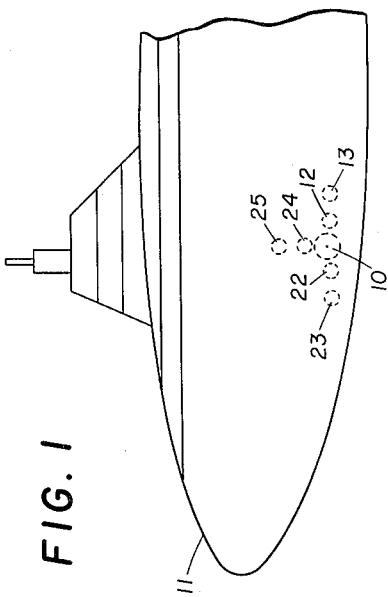
FIGURE 1 is a view of a submarine prow in which a sensing system is installed.

FIGURE 3 includes a schematic diagram of the system of FIGURE 2;

FIGURE 4 is a response curve for two source-detector spacings in FIGURES 1–3;

FIGURE 5 illustrates flow measurement from a surface vessel;

FIGURE 6 illustrates a volumetric flow sensing unit; and

FIGURE 7 is a sectional view taken along the lines 7—7 of FIGURE 6.

The present invention in one aspect thereof relates to a nuclear speedometer of the type generically represented by the diagram of FIGURE 1. In this speedometer system a neutron source 10 is mounted inside the hull of a submarine 11. Irradiation of the water outside the hull may cause the water to be temporarily radioactive. Detectors 12 and 13 located aft of the source 10 are provided for sensing any body of radioactive material adjacent thereto. The system of the present invention is designed to measure speeds through a range of from 50 knots down to zero being capable of operation at speeds even below one-tenth of a knot and provides a highly accurate measure of velocity over the entire range.

Neutrons having energies greater than about 10 m.e.v. react with oxygen to produce the nuclear transformation $O^{16}(n,p)N^{16}$. Nitrogen 16 is a radioactive isotope which decays with a half-life of 7.3 seconds, emitting beta rays and high energy gamma rays of energies of 6 m.e.v. or more. The cross section for this reaction at 14 m.e.v. is about 90 millibarns. The total non-elastic cross section for oxygen is about 850 millibarns. The total cross section for hydrogen is 690 millibarns. In water, a neutron of 14 m.e.v. initial energy may be eliminated or reduced below the threshold of the n,p reaction by non-elastic collisions with oxygen or by elastic collisions with hydrogen. However, with a flux of $10^8$ neutrons per second irradiating water, the oxygen activation will achieve equilibrium at about 100 microcuries of $N^{16}$. This reaction is employed in accordance with a preferred embodiment of the present invention to measure the relative rate of movement as between a measuring station and an activated atmosphere.

Water is first irradiated with a flux of neutrons. Subsequently gamma radiation from the induced Nitrogen 16 is detected. The gamma radiation due to its high quantum energy is highly penetrating and can be readily distinguished from background radiation. As best indicated in FIGURE 1, the source 10 and detectors 12 and 13 are positioned near the bow or at a location where the disturbance of the water through which the vessel 11 travels is at a minimum. There will be some drag along the surface of the vessel with the effect decreasing with distance from the vessel. Since relative movement between the liquid and the boat is to be measured, some oxygen activated by neutron radiation must be effected at a distance away from the hull of the vessel so that the irradiated volume will not move with the vessel but rather will remain stationary and give a true indication of speed. For this purpose, as illustrated in FIGURE 2, there is provided a sharply collimated source. The source 10 is mounted in a collimating structure 14 such as made of heavy metal so that the neutron radiation penetrates the water outside of the hull 11a in a narrow zone. The slit is controlled by the shielding structure 14 so that only the zone 15 is irradiated. As the vessel 10 moves from the position shown in FIGURE 2 to that shown in FIGURE 3, the layer of water immediately adjacent the hull 11a tends to move with the hull and thus smears the activated or tagged volume of water in zone 15. As a result, activated nuclei will be found over the entire region between the source 10 and the detector 13. However, the detectors are collimated as by the shielding structures 20 and 21. Thus, the radiation detected will be from the relatively small angle, being confined to a relatively narrow window so that nuclei a substantial distance from the boat hull 11a may be detected.

In accordance with a further aspect of the invention two different and distinct modes of operation which complement one another provide a range of measurements which extends from zero velocity up to 50 knots or more.

The source 10 may be repetitively pulsed under the control of the unit 30, FIGURE 3, repeatedly to excite the oxygen nuclei in the zone 15. At very low speeds the movement of the vessel 11 past the excited zone is such that a difference in the counting rate of the radiation detected by detectors 12 and 13 may be utilized for determination of velocity. More particularly, as shown in FIGURE 4, the response as a function of relative speed for two different spacings between the detectors is illustrated where relative counting rate is plotted against velocity in knots. The double function at lowest speeds results from the fact that the Nitrogen 16 having a half-life of about 7.3 seconds tends to decay before coming into registration with the detectors. On the other hand the longer a given body of water remains in the irradiated zone, the greater the number of oxygen nuclei becoming excited. The relative effects of the two phenomena are depicted by the initial portions of the curves of FIGURE 4. At low speed the spacings are chosen so that the time required for the vessel to move from a point at which the source 10 excites a given volume to the point at which one or both of the detectors is in registration with the given volume may be in excess of the half-life of the $N^{16}$. The decay indicated along the section 40 of the curve of FIGURE 4 will provide an index for speed determination.

With the section 40 of the curve of FIGURE 4 linear and of negative slope, the counting rate is inversely related to velocity. By measurement of count rate, velocities of very low magnitude can be determined. The spacing between source and detector may be adjusted to accommodate the desired threshold at the low end of the velocity scale. It will be noted that for a 20" spacing, velocities of the order of 0.2 knot and above can be measured.

Referring now to FIGURE 3, a particular mode of operation has been illustrated for measurement of velocities throughout the range of from very low velocity to the maximum velocity a vessel might be expected to travel. A control unit 30 is connected to source 10 and is employed periodically to energize source 10. The source 10 in general may be of the type disclosed in U.S. Patent No. 2,689,918 to Youmans which is a deuterium-tritium source for producing 14 m.e.v. neutrons free from gamma rays. Such a source suitably pulsed under the control of unit 30 is satisfactory for the excitation of oxygen nuclei in the zone 15. Control unit 30 is connected by way of conductor 50 to the first input of each of two timer units 51 and 52. Timer 51 is provided with two output channels 53 and 54 which lead to a recorder 55. Issuing from the recorder 55 is a record chart 56, the length of which is proportional to time, the recorder 55 being provided with a suitable chart drive so that a reliable time base is inherent in the record 56.

The signal on the first output channel 53 is the sum of the signals applied to the three input channels leading to timer 51. The first signal applied to the timer 51 is represented by the pulse 57 on the lower trace 58 of chart 56. The pulse 57 is derived from control unit 30 at the instant the source 10 is energized under the control of the unit 30. The second signal is instantaneously proportional to the number of gamma rays impinging detector 12. The signal from detector 12 is applied by way of conductor 60 to a discriminator unit 61. The output of unit 61 is applied by way of conductor 62 to the second input to the timer 51. The unit 61 is of the type well-known to those skilled in the art as a pulse-height discriminator for selecting from the pulse output of the detector 12 only those pulses corresponding with gamma rays of a predetermined energy band. In the present case the gamma rays from Nitrogen 16 having a half-life of 7.3 seconds have energies in two bands, the first of which is 6.13 m.e.v. and the other is 7.10 m.e.v. Preferably the discriminator 61 will pass only pulses which are within the above-identified energy range. The second signal is represented on the lower trace 58 by the waveform 63 and is proportional to the number of gamma rays impinging detector 12 having energies of 6.13 and/or 7.10 m.e.v. In a similar manner the signal from the detector 13 is applied to a discriminator unit 64, the output of which is applied by way of conductor 65 to the third input of the timer 51. The waveform 66 is representative of the gamma radiation detected within the above-identified energy band by the detector 13. Since the chart 56 has a known time base, the time required for the detectors 12 and 13 respectively to come into registration with the activated zone 15 following each of the pulses of radiation can be measured directly on the recording chart.

The onset of each pulse may be employed to measure the time interval 67. However, since both of the detectors are responsive qualitatively to similar patterns, the peak of each of the waveforms 63 and 66 may be employed to provide a more accurate measure such as represented by the time interval 68 and the time measurement is not dependent upon any precise wave shape.

The timer 51 is provided with a second output channel 54 which serves to actuate a recording pen 70. The timer 51 may include a timing circuit which generates a voltage representative of the time interval 68. Such time interval measuring circuits are well-known in the art and may be of the type such as disclosed in U.S. Patent No. 2,704,364 to Gerald C. Summers wherein pulse travel time in an acoustic well logging system is recorded as an analog function. Thus, the voltage appearing on the output channel 54 and applied to the recording pen 70 will be impressed on the record 56 as trace 71. The displacement of the trace 71 from its base line 72 may thus be maintained proportional to the time interval 68.

In conducting measurmeents by the pulse technique above-described, it is desirable that an irradiating pulse be produced as often as possible in order to maintain a high sampling rate. At the same time the period between the pulses such as pulse 57 preferably is at least as great as the time required for the remote detector 13 to move into registration with the zone 15. Preferably the pulse 57 will be of the order of 1 millisecond in length. Speeds up to the order of 50 knots may be measured by utilization of the pulse timing unit 51 either for direct recordation of the received pulses or for production of an analog signal representative of the travel of the time interval.

At very low speeds, since the half-life of Nitrogen 16 is of the order of 7.3 seconds, the activated nuclei may decay to a level such that the pulse-type measurements may not be relied upon for velocity measurements. In this case the pulse counting rate will be employed in order to provide a measure of velocity.

More particularly, as the counting rate decreases with time as shown in the curve 40, FIGURE 4, the total number of pulses detected by detectors 12 and 13 will decrease. With the output of the discriminators 61 and 64 connected to the relative counting rate unit 80, the ratio in counting rate of the two detectors 12 and 13 may be sensed in order to produce on the output channel 81 a voltage which is representative of the relative counting rate. The signal on channel 81 drives the recording unit 82 to position the trace 83. The deflection of trace 83 from its quiescent point is representative of the relative counting rate. The latter deflection may be calibrated directly in speed as indicated by FIGURE 4.

In a preferred embodiment, for a marine vessel such as a submarine, the source 10 and two detectors 12 and 13 are employed for the measurement of forward speed. The neutron source 10 preferably is such as will produce pulses at the rate of $10^8$ neutrons per second. The detectors 12 and 13 preferably are scintillator counters of the type well-known to those skilled in the art in which sodium iodide crystals are employed as the detecting phosphor. The spacings between the source 10 and detectors 12 and 13 will preferably be of the order of 3 and 5 feet, respectively. With this arrangement, transit time may be employed as a speed indication at relatively high speeds. The transit time recordings thereof may be either on the trace 58 or on trace 77. Low speeds may be measured by employing the ratio of counting rates of the two detectors as recorded on the channel 83. The ranges of operability for the two measurements overlap so that all forward speeds may be measured by utilizing the system thus far described.

In the measurement of speeds in the reverse direction, the detectors 22 and 23 would be employed along with the discriminators 85 and 86, the timer 87 and the relative counting rate meter 88. Thus, additional traces 90, 91, and 92 may be formed on the chart 56 to provide the desired measurements. It is to be understood that a switching arrangement may be employed as between the detectors and discriminators so that only two discriminators would be provided for measuring forward or reverse speeds as well as relative movement in other directions. For any given direction it will only be necessary to employ a pair of channels. However, for the purpose of illustration, parts have been duplicated in FIGURE 3.

It will be noted in FIGURE 1 that two additional detectors 24 and 25 have been shown. It may be desired under some conditions to utilize the system of the present invention for measurement of current flow when motion of the vessel is arrested, i.e., when a submarine is resting on bottom or is suitably anchored. An array of detectors as shown in FIGURE 1 may be employed for sensing the direction and the rate of flow of fluid relative to the vessel. In either event, however, it will be seen that the measurement of relative movement between the fluid medium and the sensing station within the fluid is provided. The fluid is irradiated as by source 10 in a limited zone in the region of the sensing station with high energy neutrons to activate the oxygen nuclei in the zone 15 for production of Nitrogen 16. Differences in the symmetry of the distribution of the nuclei with respect to detecting points spaced from the zone are then detected by the detectors 12 and 13. Indications of the magnitudes of the differences are then registered on the recording chart 56.

While the array illustrated in FIGURE 1 may be employed, it is to be understood that different arrays may also be found desirable and for this purpose there has been illustrated in FIGURES 5–7 modifications of the system. It will be noted, however, that each of the systems employs detectors spaced from the source to determine variations in the symmetry of the irradiated or activated atmosphere.

Referring now to FIGURE 5, there is illustrated a system particularly designed for charting the flow of ocean currents wherein operations at all depths and over a wide range of flow rates are conducted from a surface vessel. In this system a linear array of source and detectors is employed for measurement of the rate of current flow with a separate element for sensing direction.

A boat 100 is anchored by a line 101 leading to an anchor (not shown) at a measuring site. Suspended by a cable 102 is a weight 103 which is connected to the cable by a suitable shock absorber 104. The cable 102 serves as a guide line for a follower 105. The follower 105 is supported by a cable 106 which passes over a suitable sheave arrangement at the end of a boom 107. The follower 105 has an arm 108 extending therefrom from which there depends a measuring unit 110 which is supported by rods or cables 109. A float device 111 is provided at the end of the arm 108 to support much of the weight on the arm 108 and permit the arm to rotate about the guide line 102 in order that the sensing unit 110 will be maintained in alignment with any current flow at the measuring site. Included in the unit 110 is a source 120, which is shown dotted, together with a first detector 121 and a second detector 122. The detectors 121 and 122 are employed as above-described in connection with the system of FIGURE 3 for sensing the rate of flow of the currents at the location of the unit 110. Also included in the unit 110 is an element 123 which serves to sense direction of orientation of the unit 110. A telemetering compass such as known in the art is employed. By raising or lowering the follower 105, the unit 110 can be positioned at any desired depth and measurement obtained for the rate of any flow relative to the unit 110. Preferably the source 120 is a pulsed, high energy neutron source of the type above-referred to, although for low rates, continuous irradiation may be employed. The detectors 121 and 122 are scintillation-type detectors. The detector array serves to sense variations in the symmetry of any activated atmosphere around the source 120 as modified or produced by current flow. The cable 106 may be provided with suitable conductors as well-known in the art for transmission to the boat 100 of information to evaluate the properties of current flow detected by the system. The balloon 111 preferably is an oil-filled device, being filled with a fluid of such gravity as to provide buoyance of the system suspended on the arm 108 such that the net weight on the arm is just enough to submerge the measuring unit.

By making measurements both of time intervals and of relative counting rates, the magnitude of current flow over a wide range can be evaluated.

In FIGURES 6 and 7 there is illustrated a further modification of the invention which is suitable for measurement of both direction and magnitude of current flow where the orientation of the system may not be readily controlled as in the case of the current control device of FIGURE 4. In FIGURES 6 and 7 an exploring unit 150 includes a central cylindrical member 151 which houses a neutron source 152 at a midpoint thereof. Spaced above and below the neutron source 152 are a pair of detectors 153 and 154, respectively. The unit 150 has three radial arms 160, 161 and 162. The arms 160–162 are connected to the body 151 at the lead end thereof and extend outwardly and downwardly away from the body and symmetrical thereto. Each of the arms 160–162 carries a detector near the extremity thereof. More particularly, the arm 161 includes a detector 165. The arm 162 includes a detector 166. The arm 160 includes a detector 167. The detectors 165-167 are located at points along the lengths of the respective arms such that they are in the same plane as the source 152. The plane common to detectors 165, 166 and 167 and the source 152 preferably is perpendicular to the line connecting the detectors 153 and 154. At very low flow rates the measurement of the relative counting rates at each of the detectors will provide a direct indication of variations in the symmetry of the activated atmosphere in the region of the source 152. Signals from the detectors are transmitted by way of a supporting cable 170 to a boat or other associated elements where the signals may be recorded as in FIGURE 3 to provide an indication of the character of asymmetry of activated nuclei.

The body 151 also includes an element 168 for providing a first signal representative of the direction in which one of the arms 160-162, selected as a reference, is oriented with respect to an established set of coordinates. A second signal is produced by the unit 168 which senses the attitude of the body 151 relative to vertical. Thus, the device could be lowered to the ocean floor and permitted to rest upon the ocean floor in any attitude and yield data from which the direction as well as the magnitude of current flow could be evaluated. Suitable remote surveying devices for sensing both direction and dip are well-known in the art.

The utilization of the high energy neutron source 152 will produce a 7.3 second activation of oxygen, i.e., Nitrogen 16, as above described. Similarly, in sea water where sodium is present bombardment with such neutrons will produce Sodium 24 ($Na^{24}$) which is a fifteen hour beta-gamma ray emitter. Where the flow rate is low for a given spacing such as above suggested, the Nitrogen 16 would decay to insignificant levels before reaching any of the detectors. However, radiation from sodium having a fifteen hour half-life, would be detectable. Thus, a spherical aura of radioactive nitrogen and sodium will be produced around the source 152. The channels leading from the detectors may be suitably set for the activities to be measured depending upon the range of flow rates.

Although there will be some diffusion in the region of the source, there may be relied upon any net transfer of the excited nuclei as observable by comparing the response of the detectors symmetrically located with respect to the source. Simple diffusion would produce a symmetrical radial growth of the radioactive volume. Thermal diffusion may produce a vertical component of movement. Translational currents will by contrast produce an increase in counting rate at one detector and a relative decrease in the counting rate at a detector positioned on the opposite side of the source. To produce detectable concentrations of Sodium 24, a radiation period of a few minutes more or less is required, depending upon the neutron source intensity. Following such irradiation, the respective detectors are continuously monitored as by systems such as illustrated in FIGURE 3 to observe the movement of the activated water. For rapid flow measurements the pulse source may be employed with time measurements as above described for accommodating the increased ranges. However, in either event it is desirable to minimize the inadvertent perturbation of the flow pattern due to the presence of the instrument itself. The elements of the systems of FIGURES 6 and 7, for example, should be made as small in diameter as possible with due regard being given to minimizing the generation of heat which produces thermal current and other such undesirable phenomena. For the foregoing reasons, the geometries illustrated are considered preferable.

Having described the invention in connection with certain specific embodiments thereof, it is to be understood that further modifications may now suggest themselves to those skilled in the art and it is intended to cover such modifications as fall within the scope of the appended claims.

What is claimed is:
1. The method of measuring relative movement between a fluid and sensing station within said fluid which comprises:
  (a) irradiating said fluid from within said fluid in a limited zone in said fluid in the region of said sensing station with high energy neutrons to activate oxygen nuclei in said zone by production of Nitrogen 16,
  (b) detecting the delayed gamma radiation emanating from said Nitrogen 16 at three points having different locations relative to said zone in a planar array which includes said zone, and
  (c) registering indications of the differences in said gamma radiation detected at said points.
2. The method of measuring relative movement between a fluid and sensing station within said fluid which comprises:
  (a) irradiating said fluid from within said fluid in a limited zone in said fluid in the region of said sensing station with high energy neutrons to activate oxygen nuclei in said zone by production of Nitrogen 16,
  (b) detecting the delayed gamma radiation emanating from said Nitrogen 16 at at least three points having different locations relative to said zone in a three-dimensional array symmetrical to said zone, and
  (c) registering an indication of the differences in said gamma radiation detected at said points.
3. A system for measuring relative movement between a fluid and a sensing station within said fluid which comprises:
  (a) a neutron source supported within said fluid for irradiating the same in a limited zone thereof with repeated short pulses of high energy neutrons to activate nuclei in said zone by producing an assembly of radioactive nuclei, each assembly being initially distributed symmetrically with respect to said source,
  (b) three detectors responsive to gamma rays supported with said source in said fluid spaced from said source in symmetrical array relative to said source for detecting said radioactive nuclei, and
  (c) registering means connected to said detectors for indicating the magnitudes of the detected gamma radiation due to said pulses.
4. A system for measuring relative movement between a fluid and a sensing station within said fluid which comprises:
  (a) a central frame,
  (b) a neutron source supported in said frame for irradiating said fluid in a limited zone thereof with high energy neutrons to activate nuclei in said zone by producing an assembly of radioactive nuclei initially of symmetrical distribution with respect to said source,
  (c) radial arms extending symmetrically from said central frame,
  (d) a detector responsive to gamma rays supported in each of said arms in a plane common to said source for detecting said radioactive nuclei, and
  (e) registering means connected to said detectors for indicating the magnitudes of the detected gamma radiation due to said source.
5. In a system for measuring relative movement between a fluid and a sensing station within said fluid the combination which comprises:
  (a) a main frame,
  (b) a neutron source supported in said frame for irradiating said fluid in a limited zone thereof with high energy neutrons to activate nuclei in said zone by producing an assembly of radioactive nuclei initially of symmetrical configuration with respect to said source,

(c) radial arms extending in symmetrical array from said main frame,
(d) a detector responsive to gamma rays supported in each of said arms in a plane common to said source for detecting said radioactive nuclei,
(e) detectors supported in said main frame at points along a line perpendicular to said plane, and
(f) registering means connected to said detectors for indicating the magnitudes of the detected gamma radiation due to said source.

6. In a system for measuring relative movement between a fluid and a sensing station within said fluid the combination which comprises:
(a) an elongated cylindrical main frame,
(b) a neutron source supported centrally in said main frame for irradiating said fluid in a limited zone thereof with high energy neutrons to activate nuclei in said zone by producing an assembly of radioactive nuclei initially of symmetrical configuration with respect to said source,
(c) means for supporting said main frame from one end thereof,
(d) arms extending radially from said one end and turned into parallel alignment with said main frame,
(e) a detector responsive to gamma rays supported in each of said arms in a plane perpendicular to said main frame and common to said source for detecting said radioactive nuclei, and
(f) means connected to said detector for indicating the magnitudes of the detected gamma radiation due to said source.

7. A system for measuring relative movement between fluid and a sensing station within said fluid which comprises:
(a) a neutron source supported within said fluid for irradiating the same in a limited zone thereof with repeated short pulses of high energy neutrons to activate nuclei in said zone by producing assemblies of radioactive nuclei, said assemblies being initially distributed symmetrically with respect to said source,
(b) a pair of detector responsive to gamma rays supported with said source in said fluid at points spaced from said source for detecting said radioactive nuclei,
(c) timed registering means connected to said source and to said detectors for indicating the magnitudes of the detected gamma radiation due to said pulses as functions of time for measurement of relative movement at high rate, and
(d) relative count rate means connected to said detectors for indicating the relative magnitude of the intensities of gamma radiation impinging said detectors for measurement of said relative movement at low rates.

8. A system for measuring relative movement between fluid and a sensing station within said fluid which comprises:
(a) a neutron source supported within said fluid for irradiating the same in a limited zone thereof with repeated short pulses of high energy neutrons to activate nuclei in said zone by producing assemblies of radioactive nuclei, said assemblies being initially distributed symmetrically with respect to said source,
(b) a pair of detectors responsive to gamma rays supported with said source in said fluid at points spaced from said source for detecting said radioactive nuclei,
(c) pulse height discriminator means connected to said detectors for measurement of gamma rays from a selected species of nuclei rendered radioactive by said source,
(d) timed registering means connected to said source and said discriminator means for indicating the intensity of the selected gamma radiation as functions of time for measurement of said relative movement in an intermediate range to a high range, and
(e) relative count rate means connected to said discriminator means or indicating the relative magnitude of the intensities of gamma radiation of said selected species impinging said detectors for measurement of said relative movement in a low range and in said intermediate range.

9. A system for measuring relative movement between water and a sensing station within said water which comprises:
(a) a pulsed neutron source supported within said water for irradiating the same in a limited zone thereof with repeated short pulses of high energy neutrons to activate oxygen nuclei in said zone by producing assemblies of Nitrogen 16, said assemblies being initially distributed symmetrically with respect to said source,
(b) a pair of detectors responsive to gamma rays supported with said source in said water at points spaced from said source for detecting said radioactive nuclei,
(c) pulse height discriminator means connected to said detectors for selecting for measurement gamma rays from said Nitrogen 16,
(d) timed registering means connected to said source and said discriminator means for indicating the intensity of the gamma radiation from Nitrogen 16 as functions of time for measurement of said relative movement in a high range and down into an intermediate range, and
(e) relative count rate means connected to said discriminator means for indicating the relative magnitude of the intensities of gamma radiation from Nitrogen 16 impinging said detectors for measurement of said relative movement in a low range and in said intermediate range.

10. A speed indicator for use with a marine vessel which comprises:
(a) an assembly supported by said vessel including a high energy neutron source,
(b) means for energizing said source for generating neutrons to excite oxygen nuclei in the water in which said vessel is located,
(c) detector means supported in said assembly spaced from said source for detecting Nitrogen 16 produced by said neutrons,
(d) means connected to said detector means for indicating relative movement between said detector means and the excited oxygen nuclei, and
(e) means for indicating the attitude of said assembly with respect to a given set of coordinates for determining the direction of said relative movement.

11. A speed indicator for use with a marine vessel which comprises:
(a) an assembly supported by said vessel including a guide line extending downward from said vessel and a sensing system movable along said line,
(b) a high energy neutron source in said sensing system,
(c) means for energizing said source for generating neutrons to excite oxygen nuclei in the water below said vessel,
(d) a detector array in said sensing system spaced from said source for detecting Nitrogen 16 produced by said neutrons,
(e) means connected to said detector array for indicating relative movement between said detector array and the excited oxygen nuclei, and
(f) means for sensing the attitude of said sensing system with respect to said line for determining the direction of said movement.

12. A speed indicator for use with a marine vessel which comprises:
(a) an assembly supported by said vessel including a frame,
(b) a high energy neutron source mounted in said frame, (c) an array of gamma ray detectors supported in said frame having symmetrical distribution with respect to said source for detecting Nitrogen 16 produced by said neutrons, (d) means connected to said detector array for indicating the gamma radiation impinging each detector in said array to determine relative movement between said array and the excited oxygen nuclei, and (e) direction sensing means for determining the attitude of said frame with respect to a given set of coordinates for determining the direction of said relative movement.

13. A speed indicator for a marine vessel which comprises:

(a) a high energy neutron source mounted inside the hull of said vessel below the water line thereof, (b) collimating means for directing neutrons from said source as a narrow beam along a line normal to the hull of said vessel to excite oxygen nuclei in water spaced from said hull as well as in the sheath of water which is frictionally drawn with said hull, (c) detector means supported inside said hull aft of said source for detecting Nitrogen 16 produced outside said hull, and (d) collimating means for said detector means for limiting the zone of response to excited oxygen to a narrow window perpendicular to said hull at the location of said detector means whereby nuclei located in said window at points beyond the water sheath moving with said vessel may be sensed.

14. A speed indicator for a marine vessel which comprises:

(a) a high energy neutron source mounted inside the hull of said vessel below the water line thereof, (b) collimating means for directing neutrons from said source as a narrow beam along a line normal to the hull of said vessel to excite oxygen nuclei in water spaced from said hull as well as in the sheath of water which is frictionally drawn with said hull, (c) detector means supported inside said hull aft of said source for detecting Nitrogen 16 produced outside said hull, (d) collimating means for said detector means for limiting the zone of response to excited oxygen to a narrow window perpendicular to said hull at the location of said detector means, and (e) means connected to said source and detector means for measuring the time of travel of said vessel from a location at which said source excites nuclei to a location at which the excited nuclei are in said window.

15. A speed indicator for a marine vessel which comprises:

(a) a pulsed high energy neutron source mounted inside the hull of said vessel below the water line thereof, (b) collimating means for directing neutrons from said source as a narrow beam along a line normal to the hull of said vessel to excite oxygen nuclei in water spaced from said hull as well as in the sheath of water which is frictionally drawn with said hull, (c) detector means supported inside said hull aft of said source for detecting Nitrogen 16 produced outside said hull, (d) collimating means for said detector means for limiting the zone of response to excited oxygen to a narrow window perpendicular to said hull at the location of said detector means, and (e) means connected to said source and detector means for measuring the time of travel of said vessel from a location at which said source excites nuclei to a location at which the excited nuclei are in said window.

16. A speed indicator for a marine vessel which comprises:

(a) a high energy neutron source mounted inside the hull of said vessel below the water line thereof, (b) collimating means for directing neutrons from said source as a narrow beam along a line normal to the hull of said vessel to excite oxygen nuclei in water spaced from said hull as well as in the sheath of water which is frictionally drawn with said hull, (c) two detectors supported inside said hull different distances aft of said source for detecting Nitrogen 16 produced outside said hull, (d) collimating means for each of said detectors for limiting the zone of response to excited oxygen to a narrow window perpendicular to said hull at the location of each detector, and (e) means connected to said source and detectors for measuring the time of travel of said vessel from a location whereat said source excites nuclei to a location whereat the excited nuclei are in said window.

17. A speed indicator for a marine vessel which comprises:

(a) a high energy neutron source mounted inside the hull of said vessel below the water line thereof, (b) collimating means for directing neutrons from said source as a narrow beam along a line normal to the hull of said vessel to excite oxygen nuclei in water spaced from said hull as well as in the sheath of water which is frictionally drawn with said hull, (c) detectors supported inside said hull in an array around said source for detecting Nitrogen 16 produced outside said hull, (d) collimating means for each of said detectors for limiting the zone of response to excited oxygen to a narrow window perpendicular to said hull at the location of each detector, and (e) means connected to said source and detectors for measuring the time of travel of said vessel from a location whereat said source excites nuclei to a location whereat the excited nuclei are in said window.

References Cited by the Examiner

UNITED STATES PATENTS

| | | | |
|---|---|---|---|
| 2,632,326 | 3/1953 | Stuart | 250—43.5 X |
| 2,640,936 | 6/1953 | Pajes | 250—43.5 X |
| 2,841,713 | 7/1958 | Howard | 250—43.5 |
| 2,873,377 | 2/1959 | McKay | 250—43.5 |
| 2,938,119 | 5/1960 | McKay | 250—83.6 |
| 3,115,576 | 12/1963 | Rickard | 250—43.5 |

RALPH G. NILSON, *Primary Examiner.*

ARCHIE R. BORCHELT, *Examiner.*